UNITED STATES PATENT OFFICE 2,396,893

PREPARATION OF THIAZOLES

John Kenson Simons, Toledo, Ohio, assignor, by mesne assignments, to Libbey-Owens-Ford Glass Company, a corporation of Ohio No Drawing. Application August 7, 1942, Serial No. 453,987

8 Claims. (Cl. 260—302)

The invention relates to the preparation of thiazoles which are useful in the preparation of synthetic resins and which are new carbon compounds.

Thiazoles have not been known heretofore to produce thermosetting resins by reaction with aldehydes. The invention is based upon the discovery that certain types of thiazoles react with aldehydes to form thermosetting resins.

The principal object of the invention is the preparation of thiazoles that react with aldehydes to form synthetic resins. More specific objects and advantages are apparent from the description, which discloses and illustrates the invention and is not intended to impose limitations upon the claims.

Bis-(2-amino-4-thiazolyl),

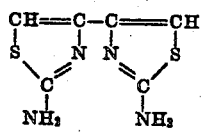

does not form thermosetting resins by reaction with aldehydes.

The novel carbon compounds of the present invention, which do react with aldehydes to form thermosetting resins, are substances having the general formulae

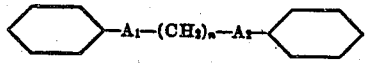

and $R_1$—$A_1$—$B$—$A_2$—$R_2$, in which $A_1$ and $A_2$ are bivalent radicals selected from the group consisting of.

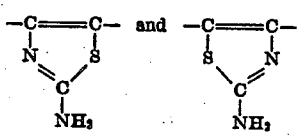

$n$ is an integer not greater than 12; $R_1$ and $R_2$ are monovalent radicals selected from the group consisting of H, methyl, ethyl, n-propyl, isopropyl, phenyl and benzyl; B is a bivalent radical selected from the group consisting of phenylene, substituted phenylene having not more than four monovalent substituents of which not more than three are methyl and not more than two are selected from the group consisting of methoxy and ethoxy, —$r_1$—O—$r_2$—, and

$r_1$ and $r_2$ are bivalent radicals selected from the group consisting of phenylene and substituted phenylene having not more than two monovalent substituents selected from the group consisting of methoxy and ethoxy; and $x$ is an integer not greater than 6.

A highly convenient method, embodying the invention, for preparing such compounds includes the step of carrying out a Friedel-Crafts reaction between an aromatic compound and an acyl halide. By the use of that step, it is possible to prepare a dihalo diketone which is then reacted with thiourea. The product of the latter reaction is a hydrohalide which may be treated with a base in order to set free the novel carbon compound that is capable of reacting with aldehydes to produce thermosetting resins.

Such a method may be carried out by causing a Friedel-Crafts reaction to take place between a substance having the general formula

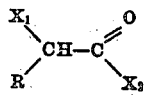

in which $X_1$ and $X_2$ are selected from the group consisting of Cl and Br, and R is selected from the group consisting of H, methyl, ethyl, n-propyl, isopropyl, phenyl and benzyl, and a substance selected from the group consisting of benzene, a substituted benzene having not more than four monovalent substituents of which not more than three are methyl and not more than two are selected from the group consisting of methoxy and ethoxy, and substances having the general formulae $Y_1$—O—$Y_2$, and $$Y_1—O—(CH_2—CH_2—O)_x—Y_2$$

in which $Y_1$ and $Y_2$ are selected from the group consisting of phenyl and substituted phenyl having not more than two monovalent substituents selected from the group consisting of methoxy and ethoxy; and $x$ is an integer not greater than 6, and then reacting with thiourea the dihalo diketone so obtained. In the Friedel-Crafts reaction, in the first step of such a method, 2 mols of the halogenated acyl halide react with each mol of the aromatic compound, and in the second step of such a method, 2 mols of thiourea react with each mol of the dihalo diketone.

The preferred starting materials are chloroacetyl chloride

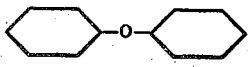

and either diphenyl ether

or the diphenyl ether of ethylene glycol

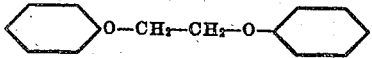

or the diphenyl ether of a polyethylene glycol containing not more than 6 ethylene groups

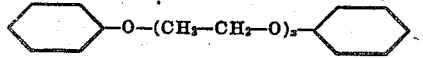

Still other novel carbon compounds embodying the invention are produced by carrying out a Friedel-Crafts reaction between 1 mol of the dihalide of a dibasic straight chain aliphatic acid containing from 3 to 14 methylene groups between the carbonyl halide groups, and 2 mols of benzene, and then halogenating the outer-most methylene groups of the resulting diketone to produce a dihalo diketone which can be converted to a bis-thiazolyl compound by reaction with thiourea.

This method is versatile in that the use of various aromatic compounds and acyl halides in the Friedel-Crafts reaction makes possible the preparation of various dihalo diketones. The large variety of novel carbon compounds produced by the reaction of these dihalo diketones with thiourea react wtih aldehydes to produce thermosetting resins that have widely varied properties and are therefore suitable for various uses.

*Example 1*

2 mols of chloroacetyl chloride are mixed with 1 mol of diphenyl ether. The mixture is then added slowly to a well-stirred suspension of 2 mols of anhydrous aluminum chloride in 850 cc. of carbon disulfide contained in a vessel surrounded by ice. After the addition of all the reactants, a reddish oil is present. In order to keep the oil mobile enough for continued stirring, the reaction vessel is surrounded with luke warm water while the reaction is continued for 4 hours. Hydrogen chloride is liberated. The carbon disulfide is then poured off and the reddish oil is decomposed by addition of water containing sufficient hydrochloric acid to prevent the aluminum chloride from hydrolyzing to aluminum hydroxide. The resulting precipitate is separated and may be purified by crystallization from alcohol to produce a 50 per cent yield of p,p'-bischloracetyl-diphenyl ether, which is a nearly white solid melting at 99–102° C. The foregoing step is a typical Friedel-Crafts reaction. 150 grams of this substance, 250 grams of thiourea, and 750 cc. of water containing 4 cc. of concentrated hydrochloric acid are heated on a water bath until precipitation of the resulting hydrochloride has been completed. The precipitate is separated and then dissolved in 9 liters of boiling water. After filtration, the hot solution is neutralized with a solution of sodium bicarbonate. The solid product is filtered, washed, and then recrystallized from the methyl ether of ethylene glycol to give the p,p'-bis-(2-amino-4-thiazolyl) diphenyl ether

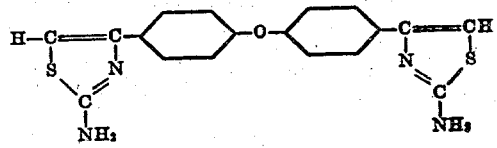

which melts at 246–248° C. The over-all yield of this product based on the amount of diphenyl ether used is about 44 per cent.

*Example 2*

40 grams of sodium hydroxide and 94 grams of phenol are dissolved in 100 cc. of water. After the addition of 100 cc. of alcohol and 94 grams of ethylene dibromide, the solution is refluxed for 16 hours, filtered and then cooled. The solid diphenyl ether of ethylene glycol that separates, after recrystallization from alcohol, has a melting point of 97° C. A mixture of 48 grams of this substance and 40 cc. of chloracetyl chloride is added slowly to a well-stirred suspension of 60 grams of anhydrous aluminum chloride in 300 cc. of carbon disulfide contained in a vessel surrounded by ice. After this addition, the reaction vessel is surrounded with luke warm water while the reaction is continued for 4 hours. The carbon disulfide layer is decanted and the oil that remains is decomposed by addition of water containing sufficient hydrochloric acid to prevent the precipitation of aluminum hydroxide. The dichloro diketone which separates as a precipitate melts at 155–165° C. 30 grams of this substance and 16.5 grams of thiourea are dissolved in n-butanol and heated at boiling temperature until precipitation of the resulting hydrochloride has been completed. The precipitate is dissolved in water and the aqueous solution is neutralized with sodium bicarbonate and then boiled to cause precipitation of the bis-(2-amino-4-thiazolyl) diphenyl ether of ethylene glycol, which has a melting point of 255–260° C.

*Example 3*

The procedure of Example 2 is followed except that 72 grams of β, β'-di-chloroethyl ether are used instead of the 94 grams of ethylene dibromide, and the initial product is the diphenyl ether of diethylene glycol having a melting point of 65–70° C. The procedure of Example 2 is then continued using a mixture of 26 grams of this substance with 18 cc. of chloracetyl chloride and a suspension of 25 grams of anhydrous aluminum chloride in 120 cc. of carbon disulfide. In the next step of the reaction, 16.5 grams of the dichloro diketone and 10 grams of thiourea are employed. The final product is a bis-(2-amino-4-thiazolyl) diphenyl ether of diethylene glycol having a melting point of 178–179° C.

*Example 4*

The procedure of Example 2 is followed except that 94 grams of the β, β'-di-chloroethyl ether of ethylene glycol are used instead of the 94 grams of ethylene dibromide. At the end of the 16 hours of refluxing in the first step, sodium chloride has separated out and the supernatant liquid is decanted from the sodium chloride. After the decanted liquid has been allowed to cool, an oil layer can be separated. Drying this oil by means of calcium chloride followed by distillation gives as the distillate the diphenyl ether of triethylene glycol, which boils at 240° C. under a pressure of 15 mm. of mercury and has a melting point of 42° C. The procedure of Example 2 is then continued using a mixture of 30 grams of this substance with 22 cc. of chloracetyl chloride and a suspension of 35 grams of anhydrous aluminum chloride in 200 cc. of carbon bisulfide. In the next step of the reaction, 30 grams of the dichloro diketone and about 20 grams of thiourea are employed. The final product is a bis-(2-amino-4-thiazolyl) diphenyl ether of triethylene glycol which sinters at 150° C. and melts at 165° C.

*Example 5*

A mixture of 15 grams of anisole and 90 grams of bromoacetyl bromide is added slowly to a well-stirred suspension of 40 grams of anhydrous aluminum chloride in 230 grams of carbon disulfide contained in a vessel surrounded by ice. After this addition, the reaction vessel is surrounded with luke warm water while the reaction is continued for 4 hours. The resulting solution together with sufficient hydrochloric acid to prevent the precipitation of aluminum hydroxide is then poured on ice. The non-aqueous product is separated from the ice and extracted with diethyl ether and the ether extract is evaporated to a residue that is still liquid. Then after the addition of 70 cc. of ethyl alcohol, the product is cooled to crystallize the bis-bromacetyl anisole, which has a melting point of 76–80° C. 3.3 grams of this substance and 1.4 grams of thiourea are dissolved in 30 cc. of 60 per cent ethyl alcohol and heated on a water bath for 2 hours. After cooling, a precipitate of the hydrochloride can be separated. The precipitate is dissolved in 40 cc. of hot water containing 1.5 grams of sodium bicarbonate to cause precipitation of the bis-(2-amino-4-thiazolyl) anisole which has a melting point of 205–208° C.

*Example 6*

120 g. sebacoyl dichloride is added with stirring slowly to 150 grams of anhydrous aluminum chloride in 600 cc. of benzene contained in a vessel surrounded by ice, the addition requiring about 30 minutes. The surrounding ice is then removed and stirring is continued for 1 hour and 45 minutes until the contents of the vessel have substantially attained room temperature. The contents of the vessel are then poured upon a mixture of 600 g. ice and 120 cc. conc. hydrochloric acid. Sufficient additional benzene is then added to cause all of the white precipitate to dissolve and the benzene solution is separated. After the benzene solution has been washed with a dilute solution of sodium carbonate, the benzene solution is dehydrated by means of calcium chloride and the benzene is distilled off. The residue of alpha,omega-dibenzoyl octane is purified by recrystallization from alcohol. 40 grams of the product and 180 cc. of carbon tetrachloride are heated under reflux and about 40 grams of bromine are added one drop at a time, until no further absorption of bromine occurs. Distillation is then carried out to produce a concentrated solution, which is cooled to cause crystallization. The crystalline product, which is purified by washing with a petroleum ligroin, melts at 83° C. and has the structural formula

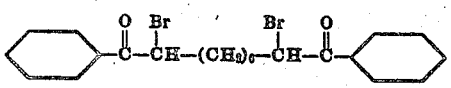

40.5 grams of this substance and 12 grams of thiourea are dissolved in 300 cc. of 65 per cent ethyl alcohol and heated on a water bath with stirring until precipitation of the resulting hydrochloride has been completed. The precipitate is dissolved in hot water and the aqueous solution is neutralized with sodium carbonate to cause precipitation of a 36 gram yield of alpha, omega-bis-(2-amino-4-phenyl-5-thiazoyl) hexane, which melts at 202–204° C. and has the structural formula

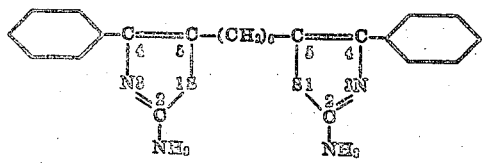

*Example 7*

16 grams of α-chlorpropionyl chloride are mixed with 10 grams of diphenyl ether. The mixture is then added to a well-stirred suspension of 15 grams of anhydrous aluminum chloride in 75 cc. of carbon disulfide contained in a vessel surrounded by ice. After this addition, the reaction vessel is surrounded with luke warm water while the reaction is continued for 4 hours. The carbon disulfide is decanted and the oil that remains is decomposed by addition of water containing sufficient hydrochloric acid to prevent the precipitation of aluminum hydroxide. The resulting product which separates as a precipitate is p,p'-bis-alpha-chloropropionyl diphenyl ether, having a melting point of 78–85° C. 11 grams of this substance and 8 grams of thiourea are dissolved in n-butanol and heated at boiling temperature until precipitation of the resulting hydrochloride has been completed. The precipitate is dissolved in water and the aqueous solution is neutralized with sodium carbonate and then boiled to cause precipitation of p,p'-bis-(5-methyl-2-amino-4-thiazolyl) diphenyl ether which melts at 244–246° C. and has the structural formula

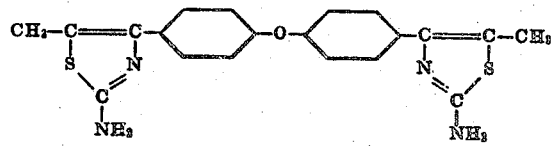

Various embodiments of the invention may be devised to meet various requirements.

Having described the invention, I claim:

1. A novel carbon compound selected from the group consisting of substances having the general formulae

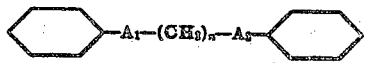

and R₁—A₁—B—A₂—R₂, in which A₁ and A₂ are bivalent radicals selected from the group consisting of

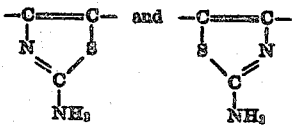

n is an integer from 2 to 12; R₁ and R₂ are monovalent radicals selected from the group consisting of H, methyl, ethyl, n-propyl, iso-propyl, phenyl and benzyl; B is a bivalent radical selected from the group consisting of phenylene, substituted phenylene having not more than four monovalent substituents selected from the group consisting of methyl, methoxy and ethoxy, of which not more than three are methyl and not more than two are selected from the group consisting of methoxy and ethoxy, —r₁—O—r₂—, and

r₁ and r₂ are bivalent radicals selected from the group consisting of phenylene, and substituted phenylene having not more than two monovalent substituents selected from the group consisting of methoxy and ethoxy; and x is an integer not greater than 6.

2. As a novel carbon compound, a bis-(2-amino-4-thiazolyl) diphenyl ether of ethylene glycol, having the general formula

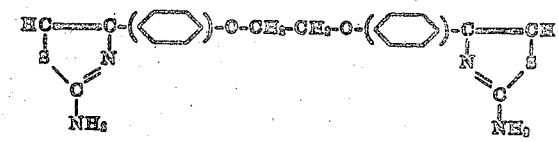

3. As a novel carbon compound, a bis-(2-amino-4-thiazolyl) diphenyl ether of a polyethylene glycol containing not more than six ethylene groups, having the general formula

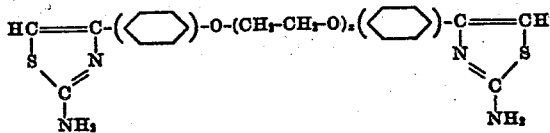

in which $x$ is an integer not greater than 6.

4. As a novel carbon compound, p,p'-bis-(2-amino-4-thiazolyl) diphenyl ether, having the structural formula

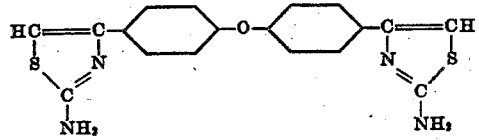

5. A method of preparing a bis-(2-amino-4-thiazolyl) diphenyl ether of ethylene glycol that comprises carrying out a Friedel-Crafts reaction between chloroacetyl chloride and the diphenyl ether of ethylene glycol, and then reacting with thiourea the dihalo diketone so obtained.

6. A method of preparing a bis-(2-amino-4-thiazolyl) diphenyl ether of a polyethylene glycol that comprises carrying out a Friedel-Crafts reaction between chloroacetyl chloride and the diphenyl ether of a polyethylene glycol containing not more than six ethylene groups, and then reacting with thiourea the dihalo diketone so obtained.

7. A method of preparing carbon compounds that comprises reacting thiourea with a compound selected from the group consisting of substances having the general formulae

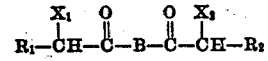

and

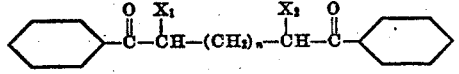

in which $X_1$ and $X_2$ are selected from the group consisting of Cl and Br; $n$ is an integer from 2 to 12; $R_1$ and $R_2$ are monovalent radicals selected from the group consisting of H, methyl, ethyl, n-propyl, isopropyl, phenyl and benzyl; B is a bivalent radical selected from the group consisting of phenylene, substituted phenylene having not more than four monovalent substituents selected from the group consisting of methyl, methoxy and ethoxy, of which not more than three are methyl and not more than two are selected from the class consisting of methoxy and ethoxy, $-r_1-O-r_2-$, and

$r_1$ and $r_2$ are bivalent radicals selected from the group consisting of phenylene, and substituted phenylene having not more than two monovalent substituents selected from the group consisting of methoxy and ethoxy; and $x$ is an integer not greater than 6.

8. A method of preparing p,p'-bis-(2-amino-4-thiazolyl) diphenyl ether that comprises reacting thiourea with p,p'-bis-chloroacetyl-diphenyl ether.

JOHN KENSON SIMONS.